United States Patent [19]

Roberts

[11] Patent Number: 4,862,484
[45] Date of Patent: Aug. 29, 1989

[54] APPARATUS FOR CLOCK RECOVERY FROM DIGITAL DATA

[75] Inventor: Richard D. Roberts, Palm Bay, Fla.
[73] Assignee: Harris Corporation, Melbourne, Fla.
[21] Appl. No.: 146,530
[22] Filed: Jan. 21, 1988
[51] Int. Cl.⁴ .............................................. H04L 7/02
[52] U.S. Cl. .................................... 375/110; 329/122; 375/96
[58] Field of Search ................... 375/110, 80, 78, 106, 375/96, 87; 455/314; 328/20; 329/122

[56] References Cited

U.S. PATENT DOCUMENTS

| | | | |
|---|---|---|---|
| 4,072,905 | 2/1978 | Keelty | 329/122 |
| 4,455,665 | 6/1984 | Kromer, III | 375/96 |
| 4,575,860 | 3/1986 | Scordo | 375/110 |
| 4,606,053 | 8/1986 | Schroder | 375/87 |
| 4,653,074 | 3/1987 | Griffin | 375/106 |
| 4,675,881 | 6/1987 | Chung | 375/110 |

Primary Examiner—Robert L. Griffin
Assistant Examiner—Marianne Huseman
Attorney, Agent, or Firm—John L. DeAngelis, Jr.

[57] ABSTRACT

A clock recovery circuit for producing a clock signal from a baseband information signal that has a data rate R. The information signal is frequency converted to a predetermined intermediate frequency by mixing the information signal with a tunable local oscillator signal having a frequency f. The resulting converted signal is bandpass filtered to extract the clock spectral line at $f+R/2$. The resulting signal is then frequency doubled, producing a signal of $2f+R$. After passing through another narrowband filter (in one embodiment a phase-locked loop) the doubled signal is reconverted to produce the spectral line at R (the recovered clock), filtered to remove the unwanted products produced in the reconversion process, and passed through a comparator to sharpen the signal edges. Using this technique, the clock signal can be recovered from information signals of different data rates without having to switch from one bandpass filter to another when the frequency of the information signal changes.

13 Claims, 5 Drawing Sheets

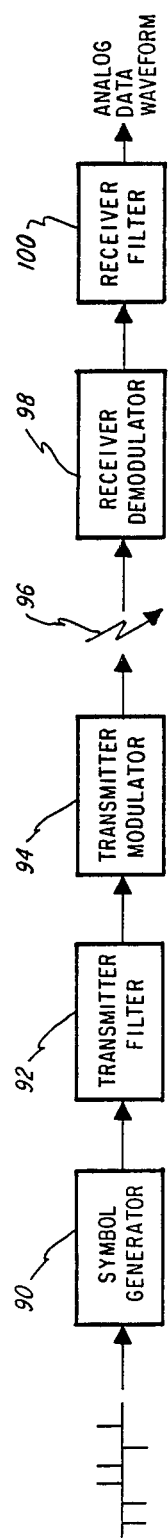
FIG. 7
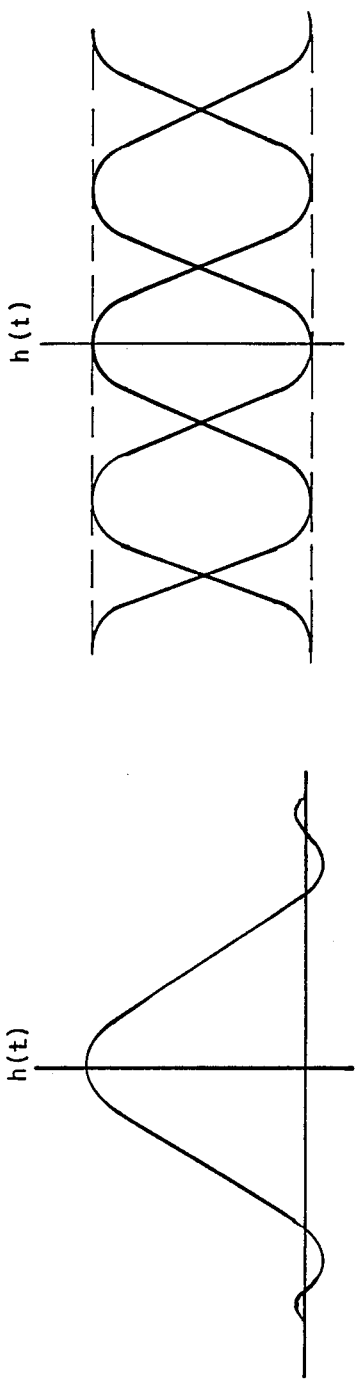
FIG. 9
FIG. 8

APPARATUS FOR CLOCK RECOVERY FROM DIGITAL DATA

FIELD OF THE INVENTION

This invention relates to a clock recovery circuit for recovering the clock signal from digital data at different baud rates.

BACKGROUND OF THE INVENTION

A large class of information signals, including speech, television, and imagery are analog in nature and must be sampled and quantized for digital storage or transmission. One common technique for digitizing the analog information is to sample it and encode the results using pulse code modulation (PCM). Pulse code modulation (PCM) is the most prevalent method of converting analog information to digital pulses. The analog voltage is sampled at regular intervals by a sample-and-hold circuit and, while this sampled value of voltage is held constant, an analog-to-digital converter converts it to a binary number. This number is proportional to the amplitude of the analog signal at the time of sampling. The binary equivalent of the sampled voltage level is transmitted and reconverted at the receive end to a voltage level by a digital-to-analog converter.

The Nyquist sampling theorem states that a bandlimited analog information signal can be digitized using PCM (and later recovered) by sampling at a rate R, if R is two or more times the maximum information signal frequency or bandwidth. If this condition is satisfied, the analog information signal can be completely recovered, at the receiving end for example, by passing the PCM signal through a digital-to-analog converter and an ideal low pass filter with a cutoff frequency equal to the maximum information signal frequency or information signal bandwidth.

Thus, the Nyquist sampling theorem states that there is a minimum rate (equal to twice the information bandwidth) at which a signal can be sampled and for which theoretically exact reconstruction of the signal is possible from its samples. If an information signal is sampled below this minimum rate, distortions in the form of spectral foldover or aliasing occur and the information signal is not recoverable. To ensure that the conditions of the sampling theorem are met for a given application, the information signal to be sampled is generally first filtered by a lowpass filter having a cutoff frequency less than (or equal to) half the sampling frequency. These lowpass filters are sometimes referred to as Nyquist filters or as brick-wall filters because of their sharp cutoff characteristics.

While PCM coding applies to the digitization of analog signals, the Nyquist sampling theorem can be applied to both analog and digital signals. A digital signal that has been bandlimited can be reconstructed by sampling at the data rate R, if the digital signal has been bandlimited to a spectrum of R/2. Digital terrestrial microwave link signals are typically bandlimited in this manner to conserve link bandwidth and are thus reconstructed at the receiving end by sampling at the bit rate R.

FIG. 1 illustrates a received digital information signal that is to be sampled for detection. The reference characters 10, 12, 14, and 16 indicate the time at which each bit interval is sampled to determine its logic level. The times 10, 12, 14, and 16 are established by a clock signal at the receiving end., the clock signal is typically derived from the received information signal. If the information signal of FIG. 1 is first band limited, for example to conserve transmission bandwidth, the step transition between the zero bit and the one bit is rounded. Depending on the bandwidth of the bandlimiting filter, the transition between the zero bit and the one bit may be changed by the filtering action to a transition represented by the dashed line between sampling time 12 and sampling time 14. Now the bandlimited signal lacks a well defined step, complicating clock recovery, and thus detection. In fact, the dashed line transition of FIG. 1 represents the optimum bandwidth constraint on the information signal. For example, if the signal reaches the one logic level prior to the sampling time 14 the signal occupies an excess of amount of bandwidth, which is objectionable from a communications link bandwidth perspective. Likewise, if the transition between the sampling times 12 and 14 reaches the one logic level after the sampling time 14 then the data cannot be properly sampled for detection because the occupied bandwidth is too narrow.

lined transition of FIG. 1 represents the optimum transition, as created by bandlimiting filter action, to ensure that a minimum bandwidth is occupied while allowing the sampling action to occur immediately after the information signal has reached a new logic level.

FIG. 2 illustrates, in a different way, the problems associated with limiting the information signal to an overly restrictive bandwidth. In this case the transitions are so severely distorted by bandlimiting, as illustrated by the dashed line, that there is not sufficient time for the information signal to reach the logic level. If the sampling occurs at the sampling times designated by reference character 10, 12, 14, and 16, the logic level at those times may be incorrect and the sampled result will also be wrong. This phenomenon, where the signal does not reach the logic level at the correct time, is known as intersymbol interference.

The key to accurate data detection at the receiving end is accurate clock recovery. If the sampling clock pulse occurs at the midpoint of each received bit interval the likelihood of accurate detection is maximized and the bit-error rate is minimized. If the information signal has not been bandlimited, i.e., is a wideband information, there are several well known clock recovery techniques that can be used. Among these techniques are a nonlinear-filter synchronizer, which is an open loop synchronizer that linearly filters the received bit stream to reduce the noise and magnify the observability of the bit transitions. The filter output is then passed through a memory-less even-law nonlinearity to produce a spectral line at the bit rate. Two closed loop type clock recovery schemes for wideband data are the in phase/midphase synchronizer and the early-late bit synchronizer. The optimum (maximum-likelihood) synchronizer is also a wideband clock recovery scheme that uses an optimal means for searching for the correct synchronization time cell during acquisition of the data. Wideband bit synchronizers or clock recovery schemes are discussed in the textbook entitled *"Digital Communications by Satellite,"* by James J. Spilker, published by Prentice-Hall, Inc. in 1977, at pages 429-447. It should be emphasized that detection and clock recovery are considerably easier for wideband signals than narrowband signals. Bandlimiting severely distorts the signal waveform to complicate the detection process. Wideband signalling is usually used in communications link circuits where bandwidth is not at a premium (e.g., low-speed telephone data communications); narrowband signalling is utilized in bandwidth-sensitive communications.

As discussed above, the concept of sampling at the bit rate to correctly detect the data is dependent on correct clock recovery. The clock frequency and phase must be determined, for example from the received bit stream, and the data must be sampled at the clock frequency for accurate detection. When the data has been bandlimited, for instance to conserve link bandwidth, accurate clock recovery is further complicated. The problem of clock recovery is exacerbated when it is necessary for clock recovery to occur in a multi-rate environment. This problem arises when the receiving device (modem) is tunable to receive signals of various data rates. In this situation one encounters both the problem of recovering the clock in a narrowband or bandlimited environment and recovering clocks of various data rates without unnecessary hardware complexity.

FIG. 3 illustrates a prior art clock recovery circuit 19 for recovering the clock signal from a bandlimited binary information signal. The information signal is input to a bandpass filter 20 that has a center frequency $f_c = R/2$, where R is the data rate. It is well-known to those skilled in the art that for a random or pseudo-random data stream (such as the bandlimited information signal) that there is a spectral line at R/2 that can be processed to extract the clock. It is also known that for any binary stream, either wideband or narrowband, there is no spectral line at the data rate R because the spectrum for a binary data stream is a sin x/x function with the first spectral null at the frequency R. The filtered signal is input to a frequency doubler 22, which is usually a square law circuit. The signal from the frequency doubler 22 is input to a narrow bandpass filter 24, which has center frequency $2f_c$ equal to the data rate R. The narrow bandpass filter 24 is often implemented as a part of a phase-locked loop, but in the embodiment of FIG. 3 the narrow bandpass filter 24 is shown as a separate element from the phase-locked loop 26. The frequency spectrums for the signals generated in each of the elements of FIG. 3 are shown in FIGS. 4A, 4B, 4C, 4D and 4E. The alphabetical letter designations in FIG. 3 identify the associated frequency spectrum of FIG. 4. Other prior art clock recovery schemes similar to the FIG. 3 embodiment are discussed in the following references: W. R. Bennett, "Statistics of Regenerative Digital Transmission", Bell System Technical Journal, Volume 37, pp. 1501–1542, November 1958; Y. Takasaki, "Timing Extraction in Baseband Pulse Transmission", IEEE Transactions on Communications, Volume COM-20, pp. 877–884, October 1972; L. E. Franks and J. P. Bubrowski, "Statistical Properties of Timing Jitter in a PAM Timing Recovery System", IEEE Transactions on Communications, Volume COM-22, pp. 913–920, July 1974.

Although the FIG. 3 embodiment recovers the clock frequency for correct sampling of the information signal, it does not recover the clock phase. For fixed data rate modems clock phase recovery is often accomplished by generating an eye pattern on a cathode ray tube and placing a manual adjustment of the clock phase in series with a clock recovery circuit. This adjustment allows the operator to control the clock phase so that the clock signal appears in or near the middle of the eye pattern. Automatic clock phase control can be implemented by including a bit error rate counter in the receiving circuitry. The bit error rate is monitored and minimized by changing the clock phase. As an alternative to moving the clock to change the phase, it is possible to actually move the data. For instance, it is well known to use adaptive equalizers to move the data so that it is in phase synchronism with the clock. The end result is that the eye pattern is again positioned correctly over the top of the recovered clock.

In the multiple baud rate environment the problems of clock frequency and phase recovery are much more complex. If the clock frequency changes by a few percent the phase-locked loop 26 can track the frequency change. But for large data rate changes, for example from 20 MHz to 40 MHz, the prior art modems or receiving devices include a bank of bandpass filters, like the bandpass filter 20, one for each received data rate. A different bandpass filter is switched in the circuit in accord with the received data rate. This obviously raises the parts count and complexity of the hardware for multiple data rate modems.

SUMMARY OF THE INVENTION

These disadvantages associated with the prior art multiple rate modems are overcome by the present invention wherein a heterodyning technique is used to change the frequency spectrum of the received data stream so that it is centered around a predetermined intermediate frequency. The frequency conversion occurs in a mixer that mixes the incoming data stream with a local oscillator signal from a tunable frequency synthesizer. The resulting mixed signal is processed through a nonlinear device and filters followed by downconversion back to the original frequency. The correct clock frequency is thereby made available for accurate detection of the incoming data stream.

This process of first upconverting and then downconverting the data stream eliminates the prior art requirement for a bank of bandpass filters, one for each data rate. With this invention the conversion process converts all incoming data rates to the same frequency and thus the clock can be recovered from all data rates using the same filter. As will be appreciated by those skilled in the art, this technique applies to any bit stream, irrespective of the coding technique that it implements, and is especially crucial in multiple rate and signal search detectors. Although intended for use on narrowband (bandlimited) signals, it can also be used on wideband data streams. Implementation can be accomplished by analog or digital techniques.

BRIEF DESCRIPTION OF THE DRAWINGS

The invention may be better understood and the further advantages and uses there more readily apparent, when considered in view of the following detailed description of exemplary embodiments, taken with the accompanying figures in which:

FIG. 7 is a block diagram of a communications link; and

FIG. 8 and 9 are waveforms illustrating the impulse response of the communications link of FIG. 7.

DESCRIPTION OF THE PREFERRED EMBODIMENTS

Figure 1:
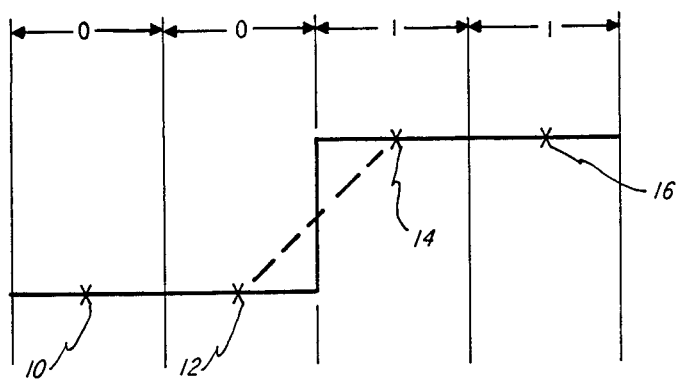
FIGS. 1 and 2 illustrate bit sequences.
Figure 2:
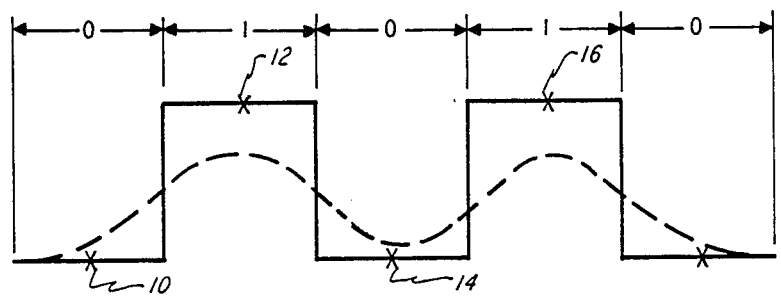
Figure 3:
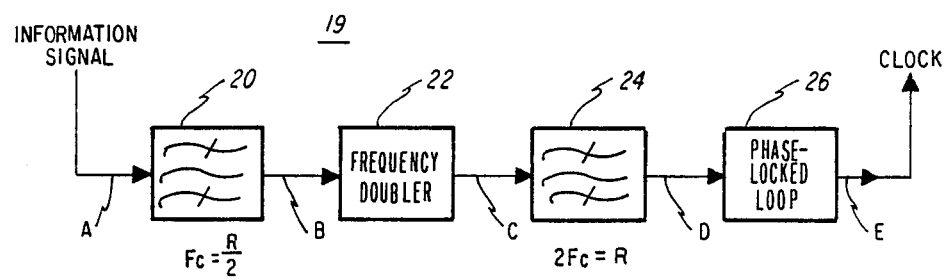
FIG. 3 is a block diagram of a prior art clock recovery circuit.
Figure 4A:
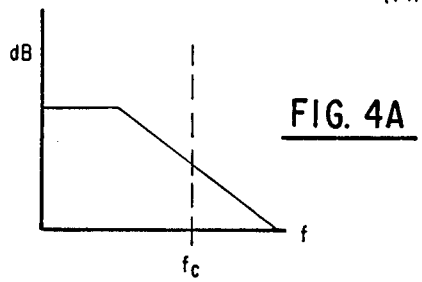
FIGS. 4A. 4B, 4C, 4D, and 4E are frequency spectrum diagrams for the FIG. 3 clock recovery circuit.
Figure 4B:
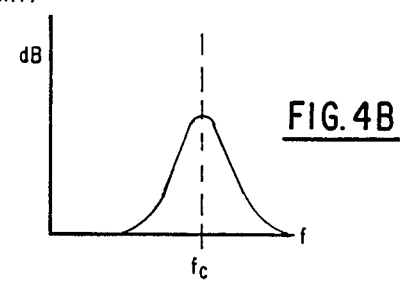
Figure 4C:
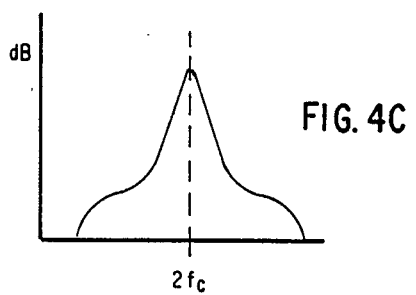
Figure 4D:
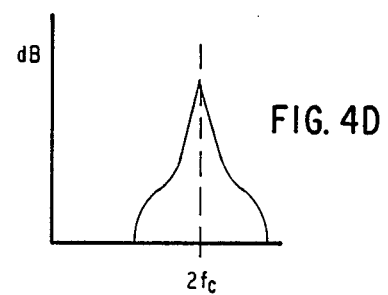
Figure 4E:
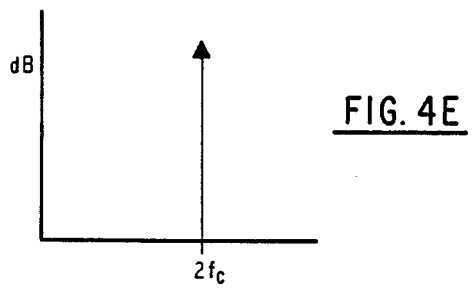
Figure 5:
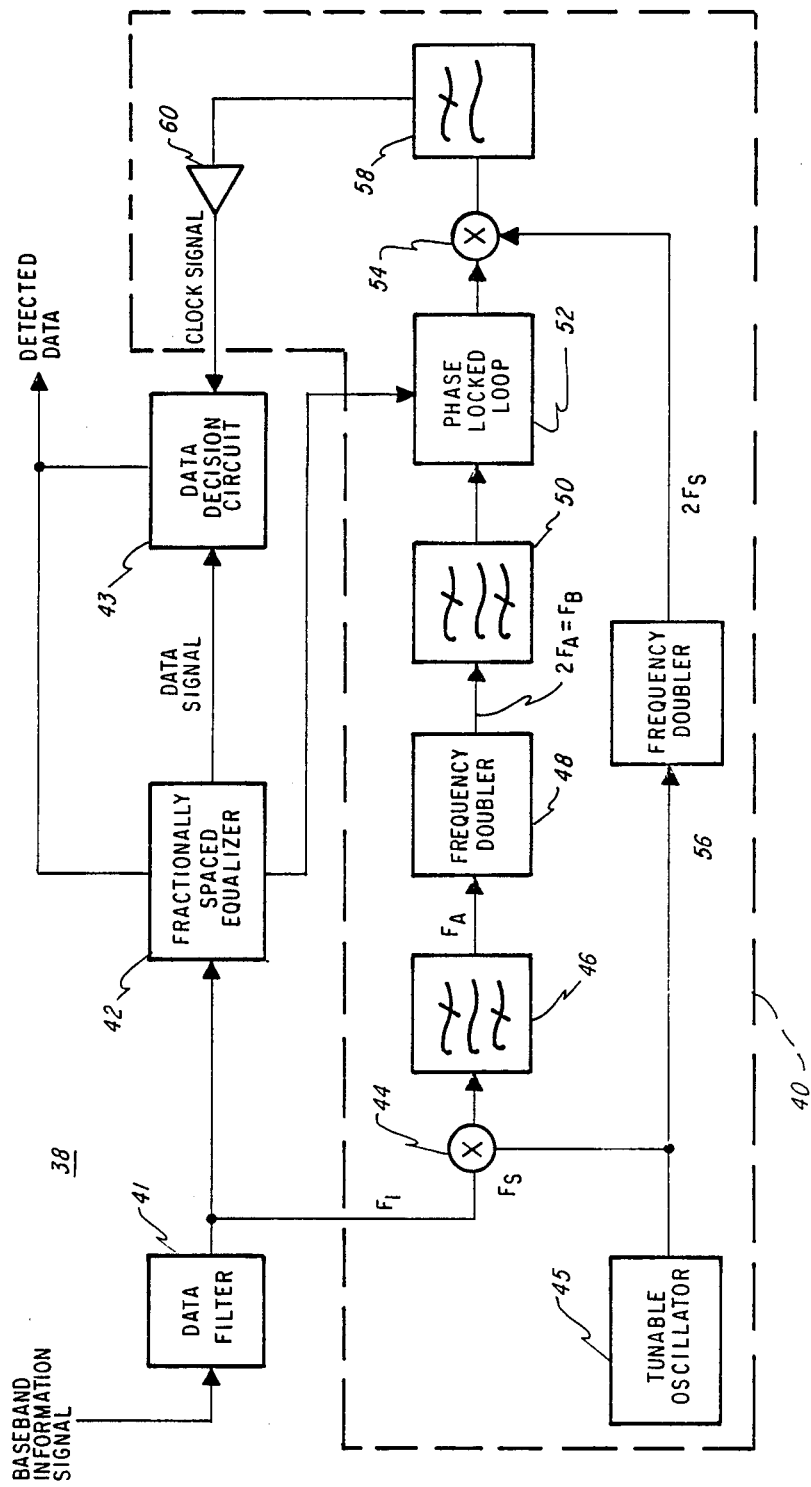
FIG. 5 is a block diagram of a data detector constructed according to the teachings of the present invention.

FIG. 5 is block diagram of a data detector 38, including a clock recovery circuit 40 constructed according to the teachings of the present invention. The baseband information signal is typically filtered in a square-root of Nyquist low pass filter at both the transmitter and receiver, with the combination of these filters producing a Nyquist filtered signal at the receiver for data detection and clock recovery. In FIG. 5 the receiver filter is designated by the reference character 41 and simply referred to as a data filter 41. Because the information signal can be considered a pseudo-random data stream there is no spectral line at the data rate R; clock recovery must be accomplished using the spectral line at R/2.

The filtered signal from the data filter 41 is input to a fractionally spaced equalizer 42 where the data is processed as will be discussed further below. The fractionally spaced equalizer 42 also provides a control signal to the clock recovery circuit 40. The clock signal from the clock recovery circuit 40 and the data signal from the fractionally spaced equalizer 42 are input to a data decision circuit 43 where the data signal is detected to reproduce the information signal. The detected data is also fed back to the fractionally spaced equalizer 42.

The Nyquist filtering bandlimits the information signal. The bandlimited signal is processed through a mixer 44 where it is mixed with the frequency synthesized signal $F_S$ from a tunable oscillator 45. If the information signal has a frequency $F_I$ (including the spectral line at R/2), the mixer produces the sum and difference signals $F_I+F_S$ and $F_I-F_S$. A narrow bandpass filter 46 extracts the Nyquist spectral line at $R/2+F_S$ from the mixed signal, with the output signal, designated $F_A$, input to a frequency doubler 4B. As the name implies, the frequency doubler 4B simply doubles the center frequency of the input signal, thus translating the spectrum from a center at $F_A$ to a center at $F_B=2F_A$. The frequency doubling process generates a signal $2F_A=F_B=(R/2+F_S)=R+2F_S$. The resulting doubled signal is input to a zonal bandpass filter 50 for removing any extraneous products introduced during the doubling process. The signal from the zonal bandpass filter 50 is input to a phase-locked loop 52, which essentially operates as a very narrow bandpass filter. The phase-locked loop 52 sharpens the clock spectral line at R, albeit translated in frequency by $F_S$ to a new frequency $2F_S+R$.

The local oscillator signal $F_S$ from the tunable oscillator 45 is also input to a frequency doubler 56. The output of the frequency doubler 56 is a signal $2F_S$ that is mixed in a mixer 54 with the output signal from the phase-locked loop 52. The mixer 54 downconverts the information signal, including the spectral line which has now been translated to a frequency R, back to its baseband location. A lowpass filter 58 filters the unwanted components created by the mixing process. The lowpass filter 58 is followed by a comparator 60 for sharpening the edges of the clock spectral line at R, i.e., converting the sine wave to a square wave. The output from the comparator 60 is the clock signal for use in ensuring accurate detection of the baseband information signal. Detection processes using the recovered clock signal are well known in the art and are not considered a part of this invention.

As was discussed above, the tunable oscillator 45 is tuned so that the resulting signal from the mixer 44 is at the correct frequency for processing by the narrow bandpass filter 46. In tuning the tunable oscillator 45 to locate the desired information signal for clock recovery, it is possible that the tunable oscillator 45 maybe slightly mistuned while still recovering the correct lock signal. One advantage offered by the upconversion and downconversion technique of the present invention is that any frequency offsets appearing in the upconversion by mixer 44 are identically cancelled in the downconversion by the mixer 54.

Figure 6:
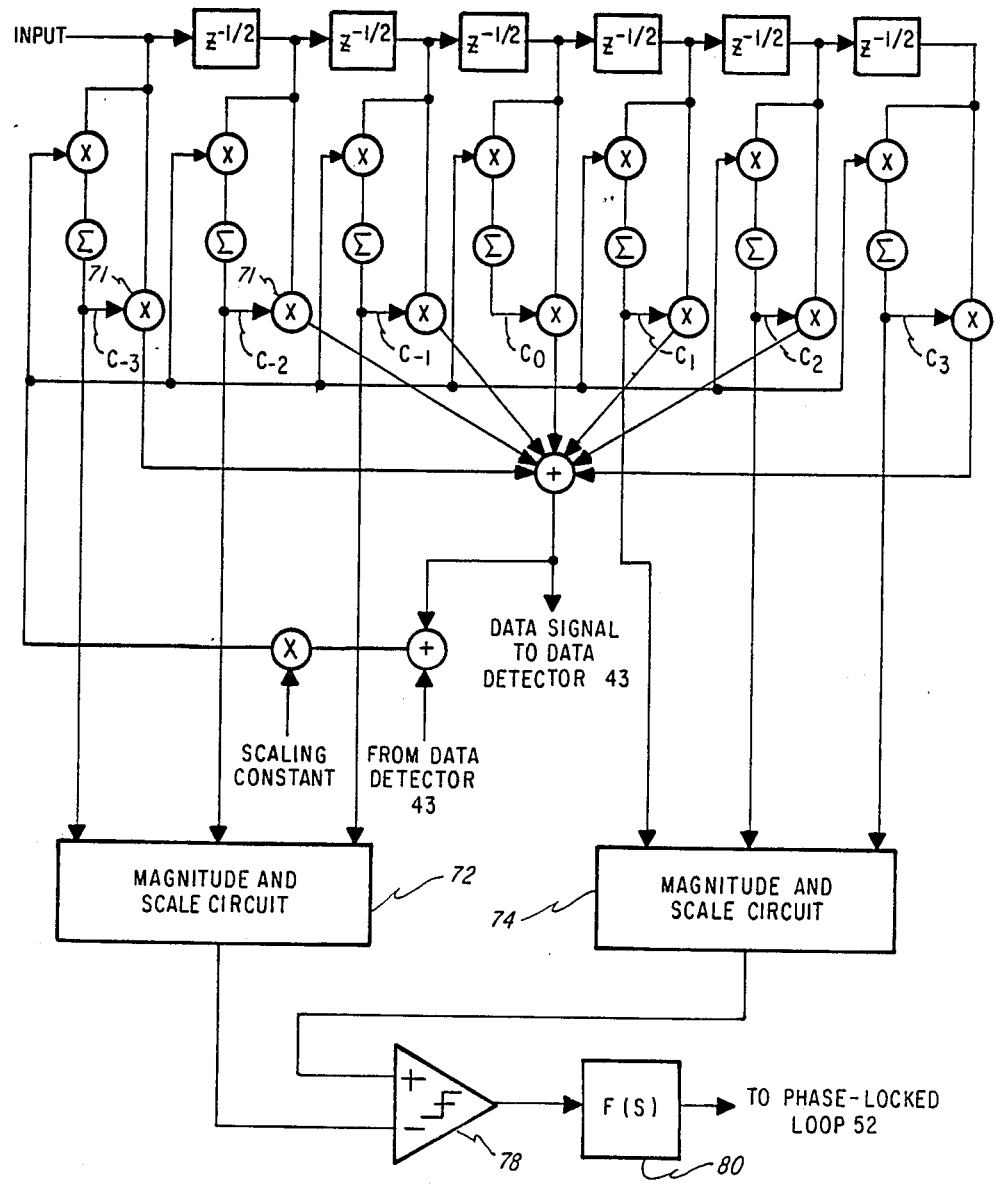
FIG. 6 is a block diagram of the fractionally spaced equalizer shown in FIG. 5.

Because the clock recovery circuit 40 extracts the clock frequency, but not the clock phase, it is necessary to phase align the recovered clock and the data to ensure accurate data detection. This alignment is accomplished with a fractionally spaced equalizer 42, which is shown in the FIG. 6 block diagram. Fractionally spaced equalizers use a feedback loop to shift the data with time so that it is properly aligned with the clock.

To better understand the operation of the fractionally spaced equalizer 42 in the present invention it is first necessary to consider a communications link and the characterization of that link by its impulse response. Such a communications link is illustrated in FIG. 7 including data or information that is represented by impulses spaced at the data clock interval. Information is input to a symbol generator 90 that converts the impulses to square waves, followed by a transmitter filter 92 and a transmitter modulator 94. The channel is designated by reference character 96, followed by the receiver demodulator 98 and a receiver filter 100. The output signal from the receiver filter 100 is an analog data signal. The combination or cascade of the elements shown in FIG. 7 provides the communications link impulse response h(t). All data can be considered as a time-super position of individual impulse responses (see FIG. 8) that when overlayed in time form a data eye pattern as shown in FIG. 9. The objective of a fractionally spaced equalizer is to move that data eye pattern so that the clock signal occurs at the peak of the impulse response illustrated in FIG. 8. While FIG. 8 illustrates a single representative impulse response of the communications link, FIG. 9 shows the time aggregate of a plurality of such impulse responses. Again, the ultimate clock placement is at the peak of the impulse response, also referred to as the maximum eye opening. A fractionally spaced equalizer, such as the fractionally spaced equalizer 42 illustrated in FIG. 6, attempts to center the impulse response h(t) with a recovered clock signal. Although a fractionally spaced equalizer operates on the data symbols individually, meaning that only one h(t) is centered over the clock at any given time, each impulse response is corrupted by adjacent symbols that bleed into the current symbol, creating intersymbol interference. Fractionally spaced equalizers are well-known in the art and are discussed in an article by R. D. Gitlen and S. B. Heinstein entitled "Fractionally Spaced Equalization: An Improved Digital Transversal Equalizer", Bell Systems Technical Journal, Volume 61, No. 8, October 1981.

Returning to FIG. 6, the fractionally spaced equalizer 42 includes a plurality of multipliers 71 each responsive to one of the tap weights $C_{-3}$ through $C_{+3}$. Each of the plurality of multipliers 71 is also responsive to the input signal delayed by one or more delay units $z^{-\frac{1}{2}}$. In addition to operating on the baseband information signal in the well known manner, the tap weight information is used in this embodiment to produce a control signal that is input to the phase-locked loop 52 for controlling the phase of the clock. The control signal is generated by using magnitude and scale circuits 72 and 74 together with a comparator 78 for determining the "center point" of the symbol impulse response as indicated by the tap weights. This tap point indicates the center weights that are most active, thus providing an indication of the center of the data symbol impulse response. The magnitude and scale circuits 72 and 74 and the comparator 78 produce a signal V where:

$$V = SGN\left[\sum_{i=1}^{3} K_i |C_i| - \sum_{j=-3}^{-1} Kj|Cj|\right]$$

Where $k_i$ and $K_j$ are scaling constants. In this embodiment $C_o$ is the fulcrum of the tap weight balance, although any tap weight can be chosen as the fulcrum.

The signal V is passed through a circuit 80 which is a filter for conditioning the signal V to control the clock phase, for example, an integrator or a lead-lag filter.

The circuit 80 produces the control signal that is provided as an input to the phase-locked loop 52. The control signal is a dc signal that is supplied as an input to the voltage controlled oscillator (not shown) of the phase-locked loop 52. It can be provided as an offset dc current injected into the loop filter (not shown) of the phase-locked loop 52, or as an input to a voltage controlled phase shifter to shift the clock phase. In any case, the control signal shifts the phase of the clock as determined by the center of the data symbol impulse response.

In the FIG. 7 embodiment, the fractionally-spaced equalizer 42 moves the data to keep most of the impulse response energy near the center of the equalizer. The end result is similar to shifting the clock phase. The control signal from the fractionally-spaced equalizer 42 to the phase-locked loop 52 also shifts the clock phase to align the data clock phase with the data. Depending on the desired bit-error rate and the intended use environment, it may be unnecessary to use both the fractionally-spaced equalizer 42 and the control signal therefrom to the phase-locked lop 52 to ensure alignment of the clock phase with the data. In some embodiments, only one of these elements may be necessary to achieve the desired performance. Multiple receive rate designs would advantageously use a fractionaly-spaced equalizer, but single rate applications could utilize the well-known T-spaced equalizer.

While several embodiments in accordance with the present invention have been shown and described, it is understood that the same is not limited thereto but is susceptible of numerous changes and modifications as known to a person skilled in the art, and I therefore do not wish to be limited to the detail shown and described herein, but intend to cover all such changes and modifications as are obvious to one of ordinary skill in the art.

What is claimed is:

1. A clock recovery circuit for producing a clock signal from an information signal having a data rate R and a frequency spectrum centered at f, said clock recovery circuit comprising:

means for producing a converted signal by frequency-converting the information signal to a frequency $f_1$;

spectral shaping filter means for filtering said converted signal to produce a filtered signal, wherein said spectral shaping filter means passes the spectral line at $f_1 + R/2$ while attenuating substantially all other frequency components of said converted signal;

means for doubling the frequency of the spectral line signal to produce a double signal;

means for converting said doubled signal back to the center frequency f, wherein the resulting signal is the recovered clock signal having a frequency R.

2. The clock recovery circuit of claim 1 wherein the means for doubling the frequency of the spectral line signal includes a nonlinear device.

3. The clock recovery circuit of claim 1 wherein the means for doubling the frequency of the spectral line signal includes zonal bandpass filter means responsive to the doubled signal for removing unwanted frequency components therefrom.

4. The clock recovery circuit of claim 1 including narrow bandpass filter means responsive to the doubled signal, wherein said narrow bandpass filter means passes only the frequency components in a narrow bandwidth around the center frequency thereof.

5. The clock recovery circuit of claim 4 wherein the narrow bandpass filter means includes a phase-locked loop.

6. The clock recovery circuit of claim 5 including means for determining the relationship between the phase of the recovered clock signal and the phase of the baseband information signal, and for producing a correction signal that is input to the phase-locked loop for changing the phase of the recovered clock signal.

7. The clock recovery circuit of claim 1 including:
   phase shifter means responsive to the recovered clock signal; and
   means for determining the relationship between the phase of the recovered clock signal and the phase of the baseband information signal, and for producing a correction signal that is input to said phase shifter for shifting the phase of the recovered clock signal.

8. The clock recovery circuit of claim 1 wherein the means for reconverting the doubled clock signal includes:
   means for providing an oscillating signal;
   mixer means having a first input terminal responsive to the doubled clock signal and a second input terminal responsive to said oscillating signal, for producing a mixed signal;
   filter means responsive to said mixed signal for removing unwanted frequency components therefrom to produce the recovered clock signal.

9. The clock recovery circuit of claim 1 including comparator means responsive to the recovered clock signal for sharpening the edges of thereof.

10. The clock recovery circuit of claim 1 wherein the baseband information signal is substantially bandlimited to a bandwidth of R/2.

11. A clock recovery circuit for producing a clock signal from a baseband information signal having a data rate R, said clock recovery circuit comprising:
   means for producing an oscillating signal;

mixer means having a first input terminal responsive to the baseband information signal and a second input terminal responsive to said oscillating signal;

wherein said mixer means produces a first mixed signal centered at a frequency f, wherein f is the frequency of the baseband information signal frequency plus said oscillating signal frequency, and a second mixed signal centered at a frequency of the baseband information signal frequency minus said oscillating signal frequency;

filter means for removing said second mixed signal;

spectral shaping filter means for filtering said converted signal to extract the spectral line signal at f+R/2;

means for doubling the frequency of the spectral line signal to produce a double signal; and means for converting said doubled signal back to baseband, wherein the resulting signal is the recovered clock signal having a frequency R.

12. A data detector responsive to a baseband information signal having a data rate R, for producing a detected signal, said data detector comprising:

means for providing an oscillating signal having a frequency f;

first mixer means having a first input terminal responsive to the baseband information signal and a second input terminal responsive to said oscillating signal;

wherein said mixer means produces a first mixed signal centered at a frequency of the baseband information signal frequency plus f, and a second mixed signal centered at a frequency of the baseband information signal frequency minus f;

first filter means for removing said second mixed signal;

means for filtering said first mixed signal to extract the spectral line signal at f+R/2;

a nonlinear device responsive to said spectral line signal for doubling the frequency thereof, to produce a doubled-frequency signal;

zonal bandpass filter means responsive to said doubled-frequency signal for attenuating unwanted frequency components therein;

a phase-locked loop responsive to the filtered double-frequency signal for extracting the spectral line at the frequency 2f+R, a fractionally-spaced equalizer responsive to the baseband information signal for time-shifting the baseband information signal and for producing a correction signal, wherein said correction signal is input to said phase-locked loop for changing the phase of the spectral line at 2f+R;

frequency doubling means responsive to said oscillating signal for producing a doubled oscillating signal;

second mixer means having a first input terminal responsive to said spectral line at 2f+R and a second input terminal responsive to said doubled oscillating signal, for producing a third mixed signal centered at a frequency of 2f+2f+R and a fourth mixed signal centered at a frequency of 2f−2f+R;

second filter means for attenuating said third mixed signal;

wherein said fourth mixed signal has a frequency R and represents the recovered clock signal;

comparator means responsive to the recovered clock signal for shaping the edges thereof.

data decision means having a first input terminal responsive to the recovered clock signal and a second input terminal responsive to the time-shifted baseband information signal for producing the detected signal.

13. A data detector responsive to a baseband information signal having a data rate R, for producing a detected signal, said data detector comprising;

wherein the baseband information signal is bandlimited;

means for producing a converted signal by frequency-converting the baseband information signal to a frequency f;

means for extracting the spectral line signal at f+R/2 from said converted signal;

means for doubling the frequency of the spectral line signal at f+R/2 to produce a doubled signal;

means for converting said doubled signal to baseband, wherein the resulting signal is the recovered clock signal having a frequency R;

means responsive to the baseband information signal at a first terminal thereof, for time shifting the baseband information signal to ensure alignment with the recovered clock signal;

means responsive to the time-shifted baseband information signal and the recovered clock signal for producing the detected signal;

wherein said means responsive to the baseband information signal at a first terminal is responsive to the detected signal at a second terminal, and wherein said means produces a correction signal that is input to said means for converting said doubled signal to baseband.

* * * * *

UNITED STATES PATENT AND TRADEMARK OFFICE
CERTIFICATE OF CORRECTION

PATENT NO.   :   4,862,484

DATED        :   August 29, 1989

INVENTOR(S)  :   Richard D. Roberts

It is certified that error appears in the above-identified patent and that said Letters Patent is hereby corrected as shown below:

In the Specification, Column 1, between lines 3 and 5, the following paragraph should be inserted.

--The United States Government has rights in the present patent under U.S. Government Contract No. MDA 904-86-C-4022.--

Signed and Sealed this

Fourteenth Day of August, 1990

*Attest:*

HARRY F. MANBECK, JR.

*Attesting Officer*         *Commissioner of Patents and Trademarks*